US010349637B2

(12) United States Patent
Erlich et al.

(10) Patent No.: US 10,349,637 B2
(45) Date of Patent: Jul. 16, 2019

(54) HAND-HELD SUBMERSIBLE AQUARIUM POWER CLEANER

(71) Applicant: Water Technology LLC, East Brunswick, NJ (US)

(72) Inventors: Guy Erlich, Monroe Township, NJ (US); John A. Many, Surfside Beach, SC (US); Thomas Lorys, Linden, NJ (US); Jonathan Elmaleh, Brooklyn, NY (US); Curtis Elliott, Washington, NJ (US); James Kosmyna, Long Pond, PA (US)

(73) Assignee: WATER TECHNOLOGY LLC, East Brunswick, NJ (US)

( * ) Notice: Subject to any disclaimer, the term of this patent is extended or adjusted under 35 U.S.C. 154(b) by 25 days.

(21) Appl. No.: 15/661,320

(22) Filed: Jul. 27, 2017

(65) Prior Publication Data

US 2018/0027780 A1    Feb. 1, 2018

Related U.S. Application Data

(60) Provisional application No. 62/367,796, filed on Jul. 28, 2016.

(51) Int. Cl.
*A01K 63/10* (2017.01)
*C02F 1/28* (2006.01)
(Continued)

(52) U.S. Cl.
CPC ............ *A01K 63/10* (2017.01); *A01K 63/006* (2013.01); *C02F 1/283* (2013.01); *C02F 2103/20* (2013.01)

(58) Field of Classification Search
CPC ....... A01K 63/10; A01K 63/006; C02F 1/283; C02F 2103/20
(Continued)

(56) References Cited

U.S. PATENT DOCUMENTS 3,225,930 A * 12/1965 Willinger ............. A01K 63/047
15/1.7
3,755,843 A    9/1973 Goertzen, III et al.
(Continued)

FOREIGN PATENT DOCUMENTS

EP    2525020 A2 * 11/2012
GB    1590623    6/1981

OTHER PUBLICATIONS

EP Extended Search Report for EP Application No. 17183605.9, dated Jan. 19, 2018.

*Primary Examiner* — Fred Prince
(74) *Attorney, Agent, or Firm* — Abelman, Frayne & Schwab

(57) ABSTRACT

A hand-held submersible aquarium power cleaner for cleaning debris from an aquarium, includes an elongated housing having an intake compartment and a filtering compartment therein. A nozzle is positioned at a front end of the housing and is in fluid communication with the intake compartment, wherein a selectively openable channel is provided between the intake compartment and the filter compartment. A filter is disposed in fluid communication with the filter compartment. A water pump assembly has an impeller rotatably connected to an electric motor, wherein the impeller is in fluid communication with the intake compartment. A power switch controls power to the electric motor so that rotation of the impeller draws aquarium water and debris through the nozzle and into the filtering compartment, where the debris is captured and retained by the filter and cleansed water is discharged into the aquarium.

20 Claims, 17 Drawing Sheets

(51) Int. Cl.
    *A01K 63/00*     (2017.01)
    *C02F 103/20*    (2006.01)

(58) Field of Classification Search
    USPC .............. 210/167.21, 416.1, 416.2; 15/1.7
    See application file for complete search history.

(56) References Cited

U.S. PATENT DOCUMENTS

| | | |
|---|---|---|
| 3,886,616 A | 6/1975 | Hayes |
| 4,443,899 A | 4/1984 | Johnson |
| 4,558,479 A | 12/1985 | Greskovics et al. |
| 4,651,376 A | 3/1987 | Ford |
| 4,801,376 A | 1/1989 | Kulitz |
| 4,935,980 A | 6/1990 | Leginus et al. |
| 4,962,559 A | 10/1990 | Schuman |
| 5,111,129 A | 5/1992 | Schuman |
| 5,124,044 A * | 6/1992 | Cassidy .............. A01K 63/04 210/167.21 |
| 5,135,647 A | 8/1992 | Childers |
| 5,137,623 A | 8/1992 | Wall et al. |
| 5,450,644 A | 9/1995 | Berman |
| 5,554,277 A | 9/1996 | Rief et al. |
| 5,569,371 A | 10/1996 | Perling |
| 5,706,539 A * | 1/1998 | Fukuda ................ B63B 57/02 15/1.7 |
| 5,768,734 A | 6/1998 | Dietrich |
| 5,842,243 A | 12/1998 | Horvath et al. |
| 5,951,854 A | 9/1999 | Goldberg et al. |
| 5,961,822 A | 10/1999 | Polimeni, Jr. |
| 6,248,232 B1 | 6/2001 | Stoner |
| 6,294,084 B1 | 9/2001 | Henkin et al. |
| 6,942,790 B1 | 9/2005 | Dolton |
| 7,178,188 B1 | 2/2007 | Jaakola |
| 8,281,441 B1 | 10/2012 | Erlich et al. |
| 2001/0004974 A1 | 6/2001 | Ekenback et al. |
| 2001/0032809 A1 | 10/2001 | Henkin et al. |
| 2001/0050093 A1 | 12/2001 | Porat |
| 2002/0002750 A1 | 1/2002 | Phillipson et al. |
| 2005/0247613 A1 | 11/2005 | Bishop et al. |
| 2006/0034831 A1 | 3/2006 | Horvath et al. |
| 2006/0265820 A1* | 11/2006 | Erlich .................. E04H 4/1636 15/1.7 |
| 2007/0094817 A1 | 5/2007 | Stoltz et al. |
| 2009/0045143 A1* | 2/2009 | Getsinger ............ A01K 63/045 210/741 |
| 2010/0193432 A1* | 8/2010 | McFarland .......... A01K 63/045 210/616 |
| 2012/0181222 A1* | 7/2012 | Sherman .............. A01K 63/006 210/138 |
| 2012/0216837 A1 | 8/2012 | Kovarick et al. |
| 2013/0264267 A1* | 10/2013 | Ho ........................ A01K 63/10 210/239 |

* cited by examiner

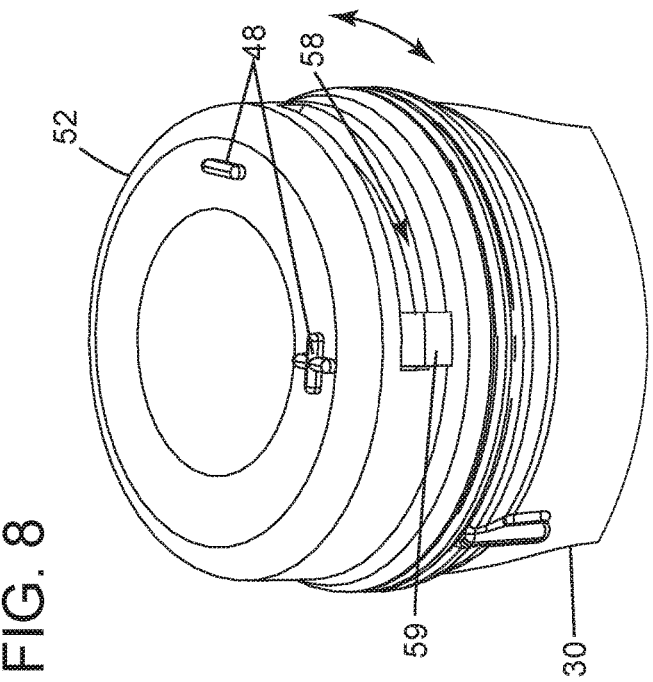
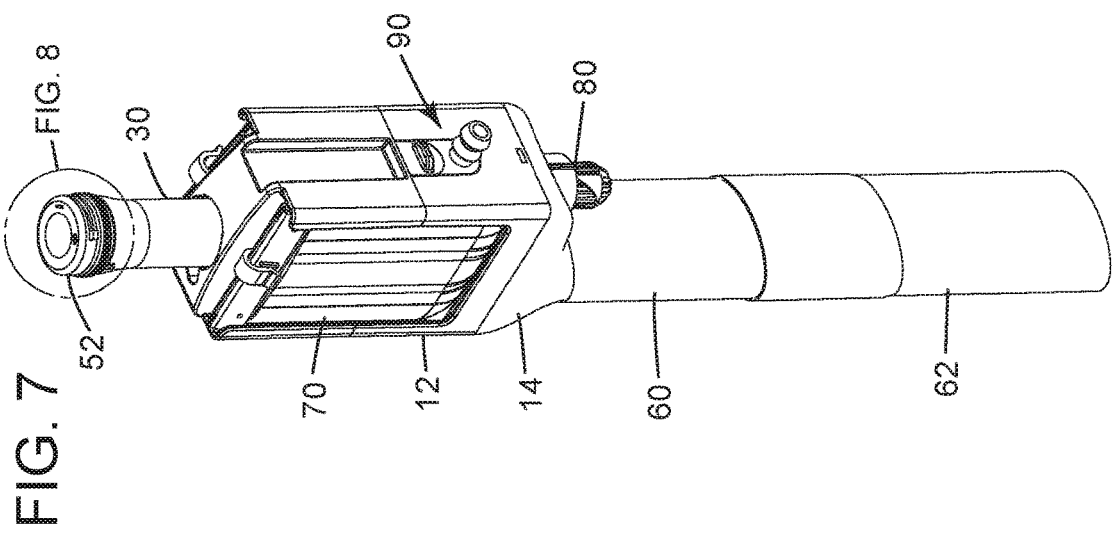

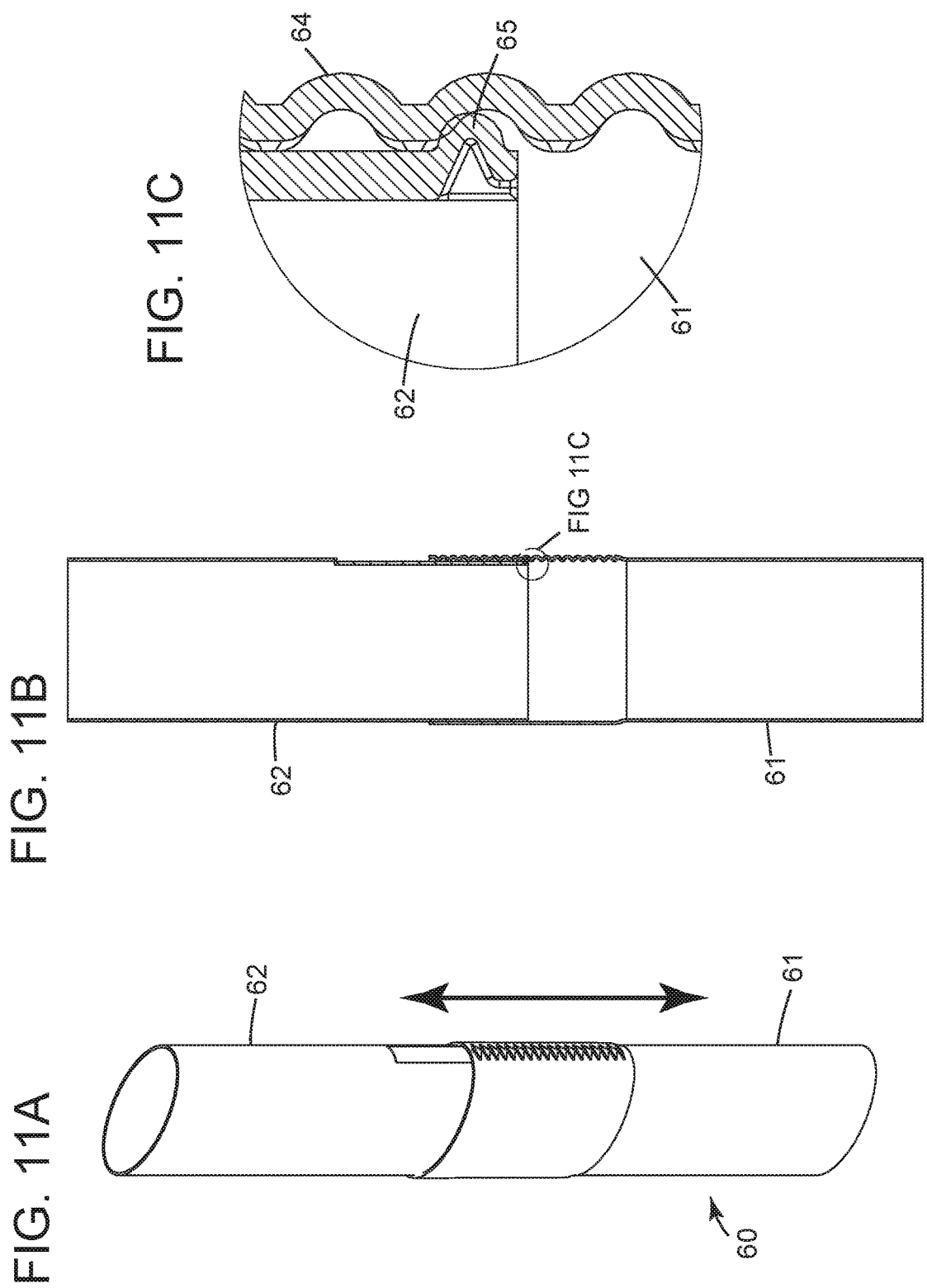

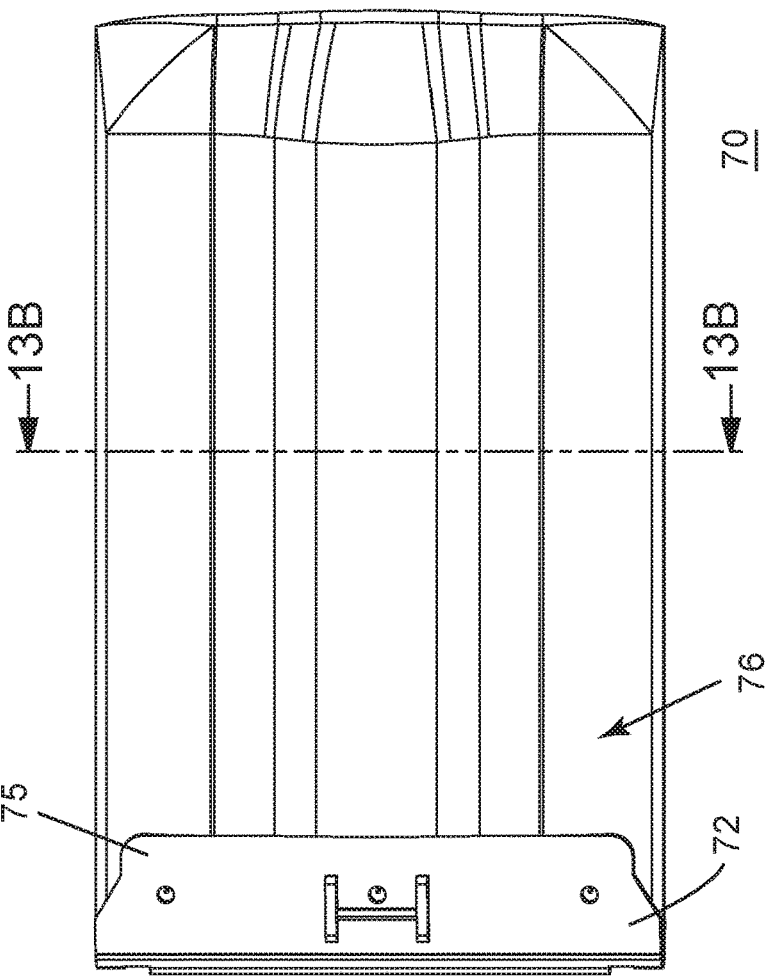

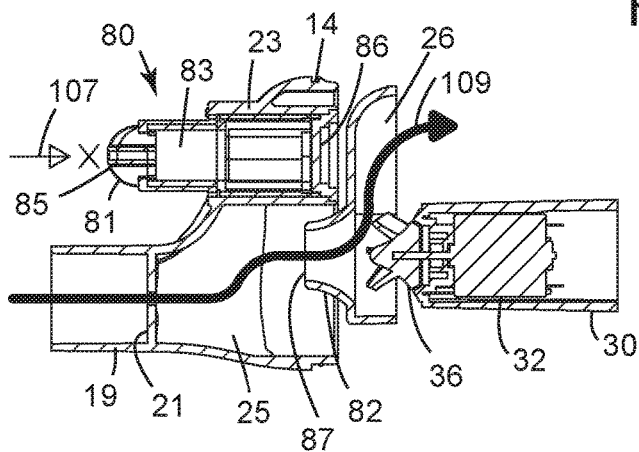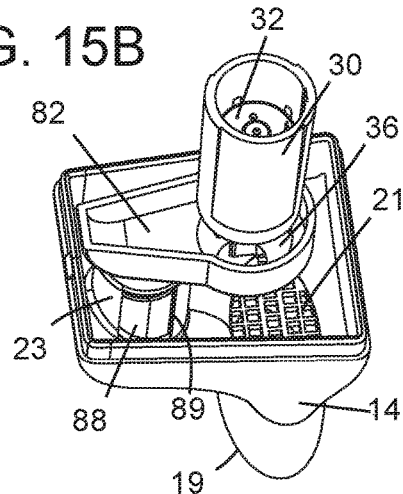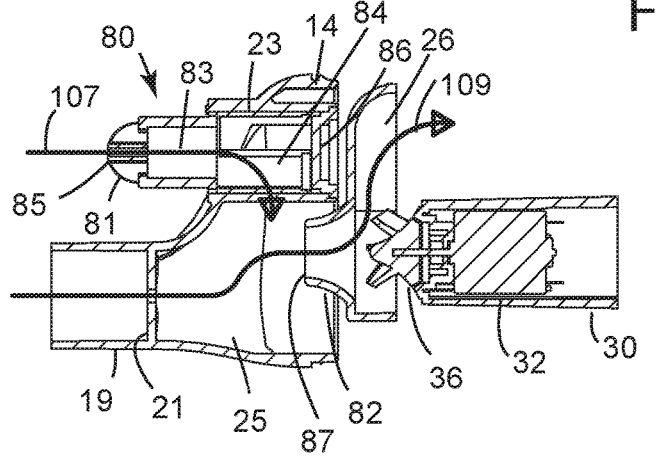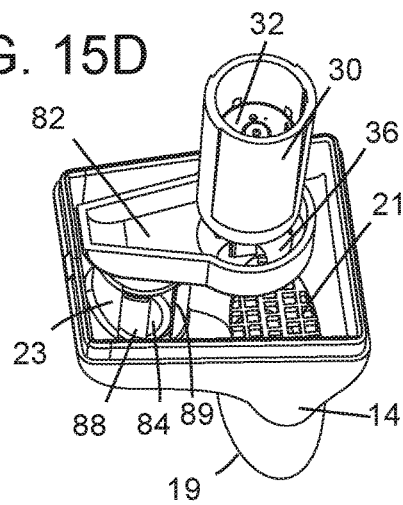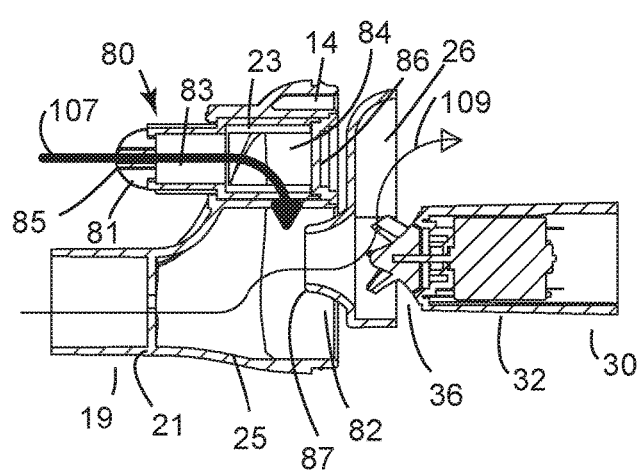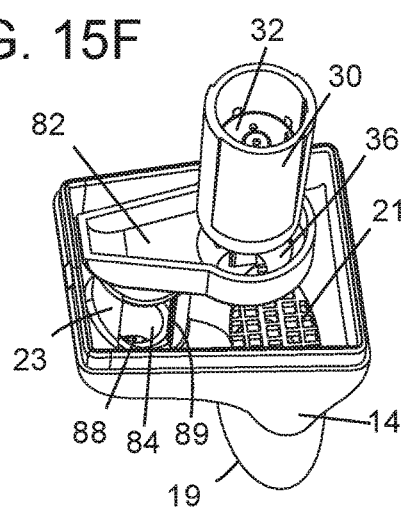

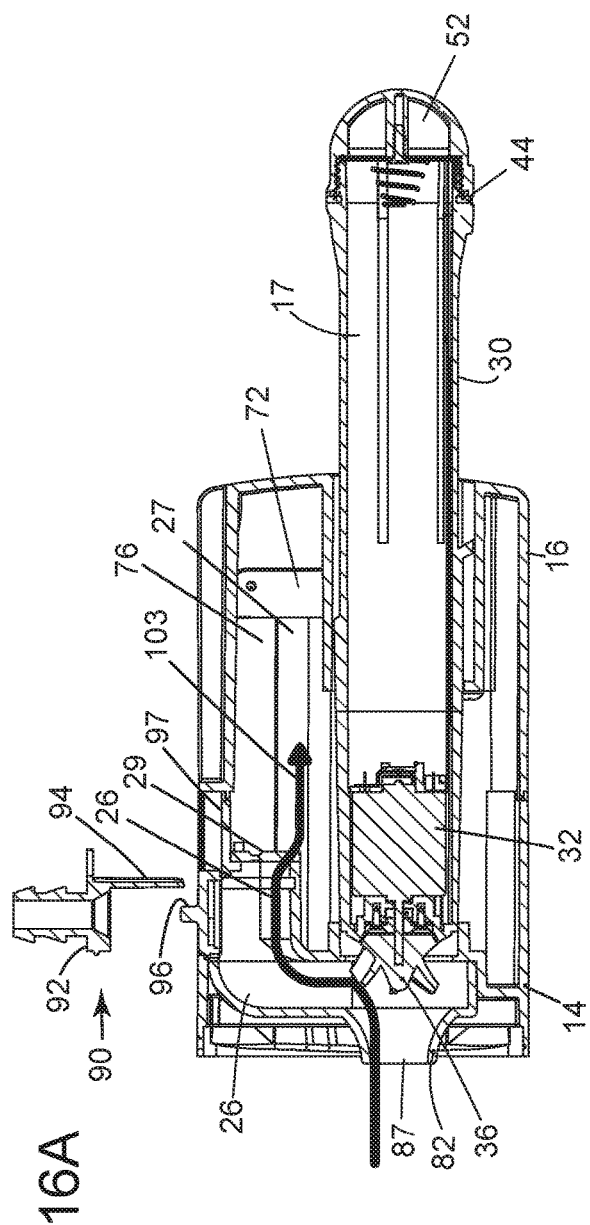
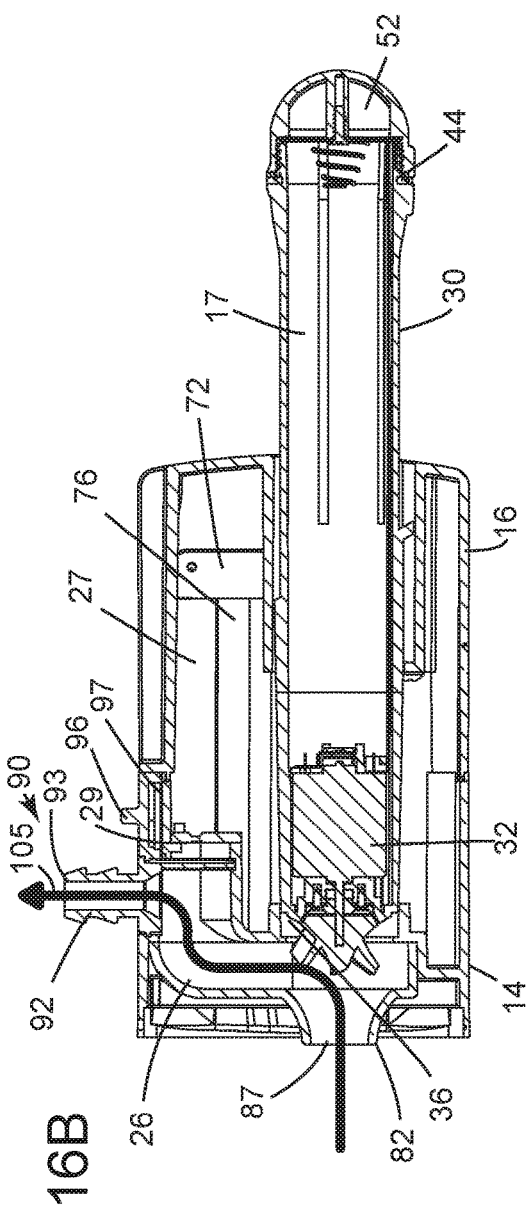

HAND-HELD SUBMERSIBLE AQUARIUM POWER CLEANER

CROSS-REFERENCE TO RELATED APPLICATIONS

This patent application claims the benefit of U.S. Provisional Application No. 62/367,796, filed Jul. 28, 2016, the content of which is incorporated by reference herein in its entirety.

FIELD OF INVENTION

The present invention is related to aquarium cleaners, and more specifically to a hand-held, aquarium power-cleaner for manually cleaning a fish tank or an aquarium.

BACKGROUND OF THE INVENTION

As a fish aquarium matures, biological waste such as excrement from the fish, uneaten food and other waste products will settle to the bottom of the tank, usually on and/or underneath whatever sand and gravel is present in said tank. The waste products will slowly change the chemical composition of the water, permitting the growth of algae and bacteria which can be harmful or fatal to the occupant fish. The buildup of the waste also produces odors that are considered foul and unpleasant. Regular maintenance activities must be provided to the aquarium to better ensure the health of the tank occupants and the aesthetic characteristics of the aquarium. Such maintenance activities typically include frequent filtering of and chemical treatments to the tank water on a daily or weekly basis, as well as less occasional removal of the waste products trapped in the gravel or sand.

Present techniques to clean the gravel or sand include the use of a siphoning pump to drain out a substantial volume of water so that a person can use scrubbing brushes and/or sponges to manually remove and absorb the trapped debris. Fresh gravel or sand may also be used to replace the dirty bottom material, but this usually requires the removal and storage of the tank occupants which is stressful to their health, and the process is often tedious and messy that many find to be unpleasant. Therefore, there is a need for an aquarium or tank cleaner for expediently and efficiently cleaning gravel or sand from the bottom of an aquarium with minimal disturbance to its occupants and the end user.

SUMMARY OF THE INVENTION

In a preferred embodiment, a hand-held submersible aquarium power cleaner for cleaning debris from an aquarium comprises: an elongated housing having an intake compartment and a filtering compartment therein; a nozzle positioned at a front end of the housing and in fluid communication with the intake compartment; a selectively openable channel provided between the intake compartment and the filter compartment; a filter disposed in fluid communication with the filter compartment; a water pump assembly having an impeller rotatably connected to an electric motor, the impeller being in fluid communication with the intake compartment; a power switch for controlling power to the electric motor, wherein rotation of the impeller draws aquarium water and debris through the nozzle and into the filtering compartment, where the debris is captured and retained by the filter and cleansed water is discharged into the aquarium.

In one aspect, the aquarium power cleaner further comprises a secondary inlet in fluid communication with the intake compartment. In another embodiment, the secondary inlet includes a control knob for controlling fluid entering the intake compartment via the secondary inlet.

In yet another aspect, the water pump assembly comprises at least one battery for providing power to the electric motor. In still another aspect, the power switch includes circuitry for selectively controlling the rotational speed of the electric motor. In another aspect, the aquarium power cleaner further comprises a resilient flap disposed to cover an end of the channel provided between the intake compartment and the filter compartment.

In one aspect, the filter comprises a multi-layer filter medium. In another aspect, the filter comprises a filter pouch disposed over a frame. In yet another aspect, the filter pouch is configured to receive one or more additives for treating the aquarium. In still another aspect, the filter is removable from the housing.

In another aspect, the aquarium power cleaner further comprises a hose fixture in fluid communication with the intake compartment to block water flow into the filter compartment, the hose fixture configured to receive an end of a hose for siphoning water out of the aquarium. In one aspect, the hose fixture is removable from the housing during a tank cleaning operation. In yet another aspect, the aquarium power cleaner further comprises a cover configured to close the intake compartment when the hose fixture is removed. In still another aspect, the nozzle is extendible to predetermined lengths. In yet another aspect, the aquarium power cleaner further comprises a grate in fluid communication between the nozzle and the intake compartment.

In another embodiment, a method of cleaning water and a bottom substrate in an aquarium comprises: providing a hand-held submersible aquarium power cleaner including an elongated housing having an intake compartment and a filtering compartment therein, a nozzle positioned at a front end of the housing and in fluid communication with the intake compartment, a selectively openable channel provided between the intake compartment and the filter compartment, a filter disposed in fluid communication with the filter compartment, a water pump assembly having an impeller rotatably connected to an electric motor, the impeller being in fluid communication with the intake compartment; a power switch for controlling power to the electric motor, wherein rotation of the impeller draws aquarium water and debris through the nozzle and into the filtering compartment; submerging the cleaner in the water of the aquarium; vacuuming over one or more selected portions of the aquarium; adjusting suctional forces of the cleaner; and capturing and retaining, by the filter, debris entrained in the water; and discharging filtered water into the aquarium.

In one aspect the submerging step comprises submerging only a nozzle of the cleaner and a portion of the water pump assembly in the aquarium. In another aspect, the providing step comprises submerging said cleaner as an auxiliary filtration system to supplement or temporarily replace a preexisting filtration system of the aquarium. In still another aspect, the adjusting step comprises adjusting an air inlet opening provided in said housing to change the flow of water into the cleaner. In yet another aspect, the method further comprises adding an additive to the filter. In another aspect, the method further comprises the step of controlling suction of the cleaner so that the bottom substrate does not flow through the nozzle and into the filter compartment.

BRIEF DESCRIPTION OF THE DRAWINGS

Further advantages and features of the present invention will become apparent from the detailed description of a preferred embodiment of the invention in reference to the accompanying drawings, in which:

FIG. 7 is a top, left side perspective view of the aquarium power cleaner of FIG. 1 illustrating a power switch;

FIG. 8 is a detailed top perspective view of the power switch of the aquarium power cleaner taken from detail A of FIG. 7 and illustrating a motor-speed controller;

FIGS. 11A-11C depict various views of an extendible nozzle assembly suitable for use with the aquarium power cleaner of FIG. 1;

FIGS. 13A-13C depict various views of a filter assembly suitable for use with the aquarium power cleaner of FIG. 1;

FIGS. 15A-15F depict various views of a flow control knob for controlling the suctional forces of the aquarium power cleaner of FIG. 1;

FIG. 16A is a partial, elevated right-side view, taken in cross-section, illustrating the flow of water into the aquarium power cleaner of FIG. 1 during a filtering operation;

FIG. 16B is a partial, elevated right-side view taken in cross-section, illustrating the flow of water into the aquarium power cleaner of FIG. 1 during a siphoning operation;

Figure 1:
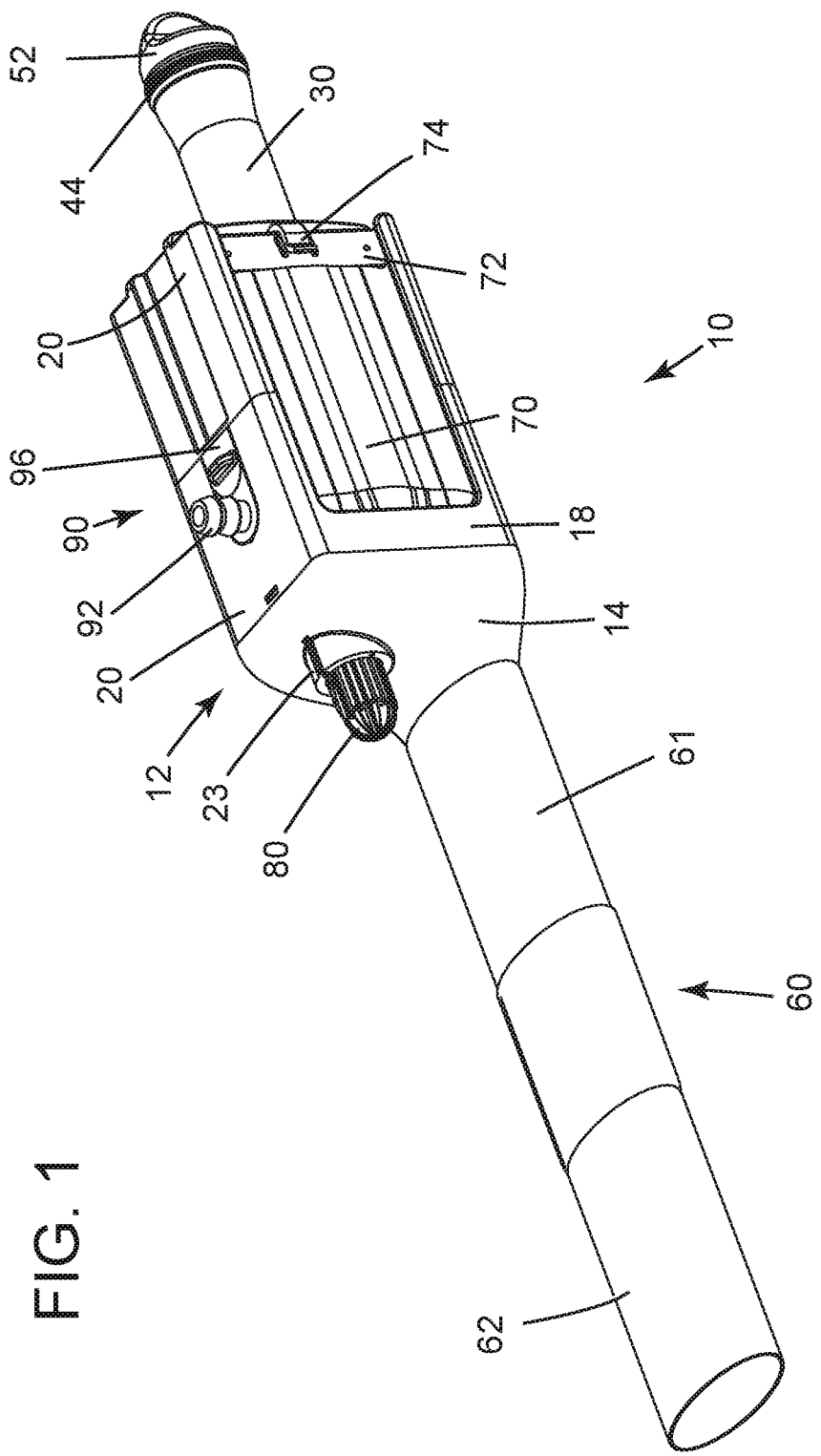
FIG. 1 is a front, top, right side perspective view of a hand-held submersible aquarium power cleaner of the present invention.

To facilitate an understanding of the invention, identical reference numerals have been used, when appropriate, to designate the same or similar elements that are common to the figures. Furthermore, unless stated otherwise, the features shown in the figures are not drawn to scale, but are shown for illustrative purposes only.

DETAILED DESCRIPTION OF THE INVENTION

Figure 2:
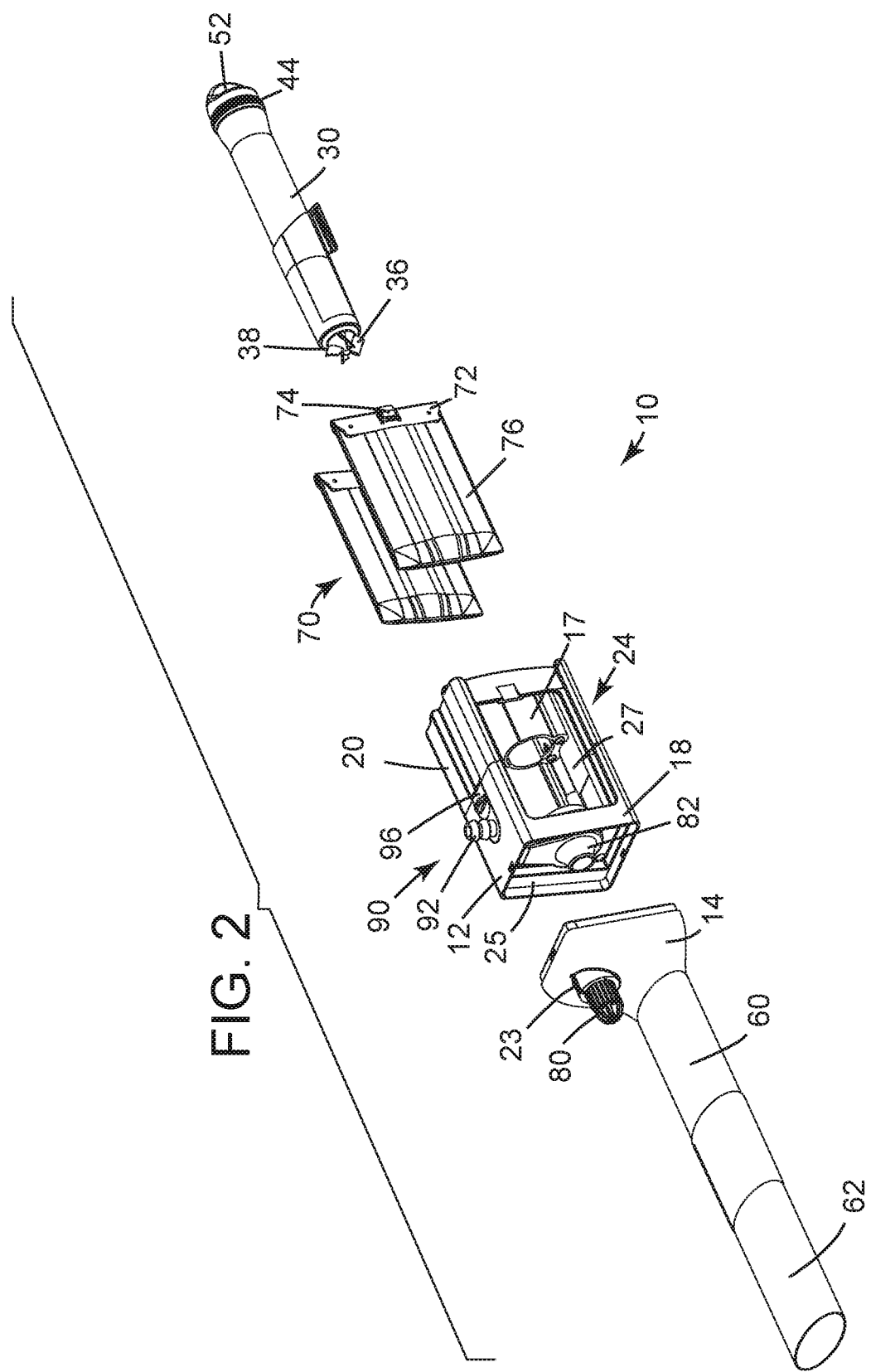
FIG. 2 is a partial exploded front, top, right side perspective view of the aquarium power cleaner of FIG. 1.
Figure 3:
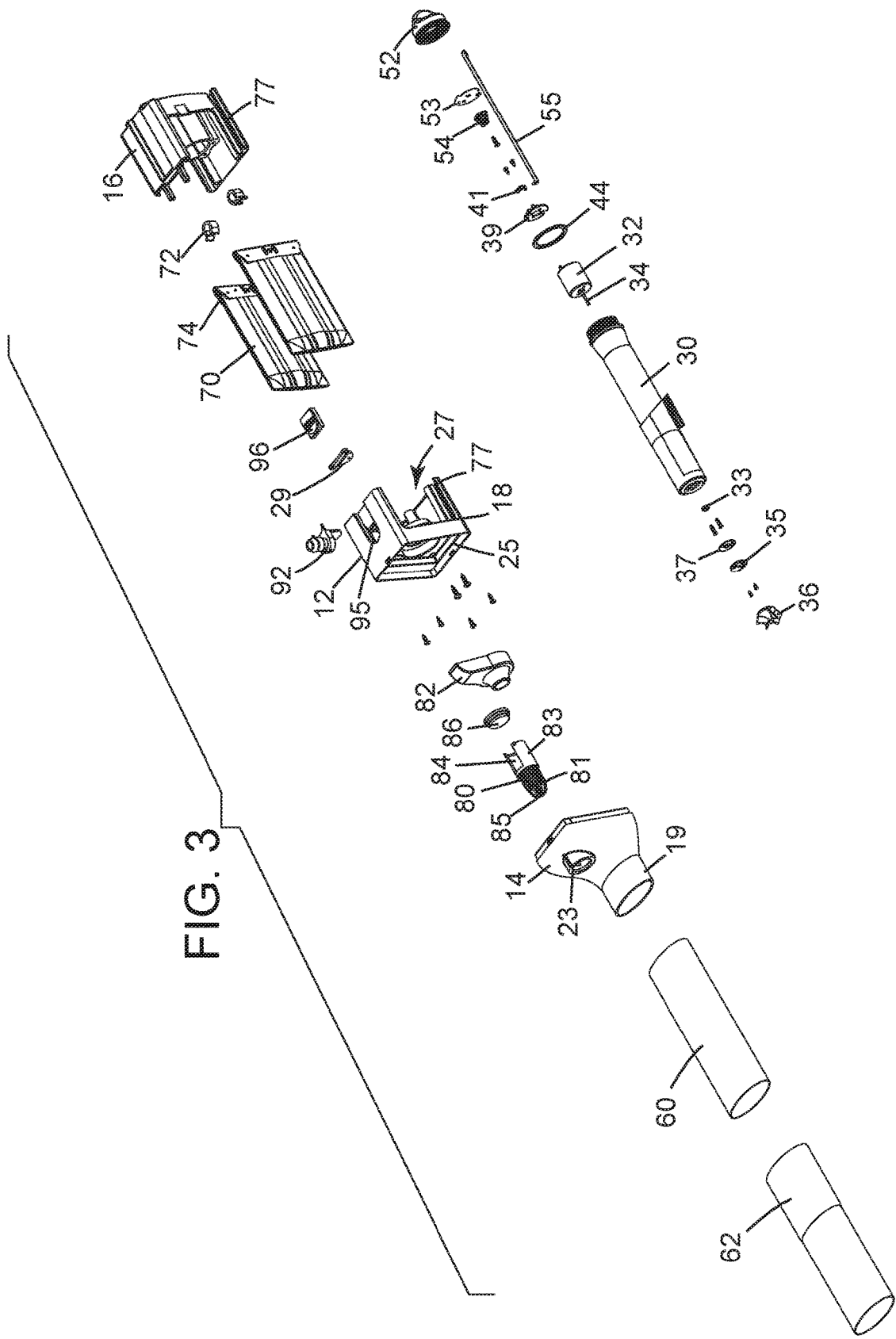
FIG. 3 is an exploded front, top, right side perspective view of the aquarium power cleaner of FIG. 1.

Referring to FIGS. 1-3, a top, right side perspective view and corresponding exploded views of a hand-held submersible aquarium power cleaner 10 of the present invention are illustratively shown. The submersible aquarium power cleaner 10 implements an electric water pump assembly 30 to draw water, gravel/sand and waste products from the bottom the aquarium, such that the bottom substrate, e.g., gravel/sand will remain suspended within an intake nozzle 61 or nozzle assembly 60, while the waste and debris continues to flow into the cleaner 10 and is trapped by a filter 70, and the filtered water flows back into the aquarium.

Figure 9:
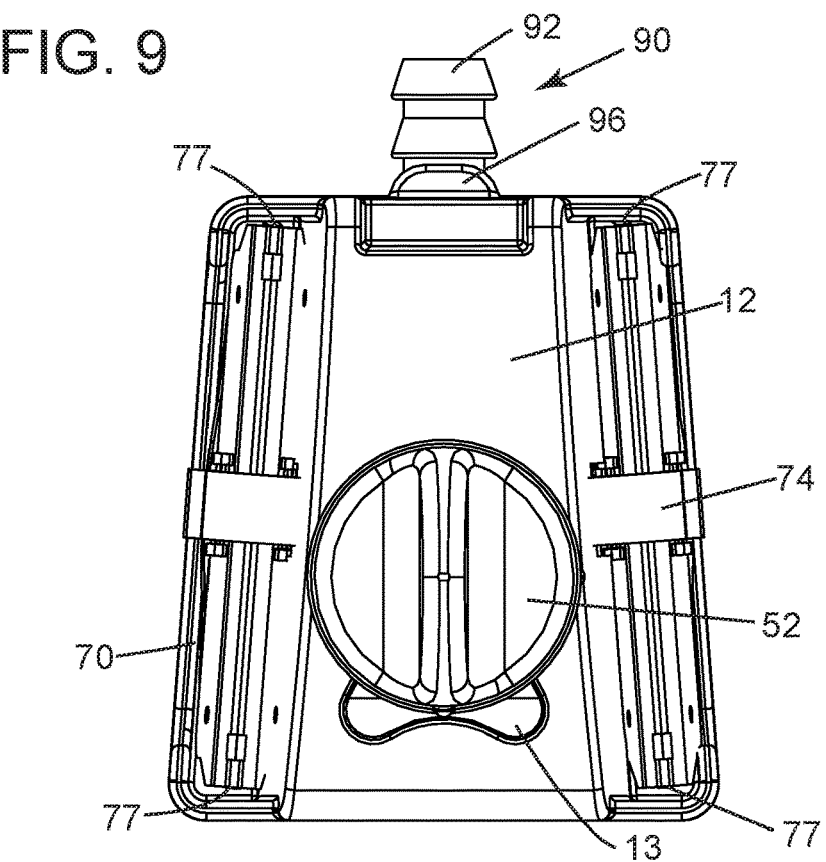
FIG. 9 is a rear elevated view of the aquarium power cleaner of FIG. 1.
Figure 10:
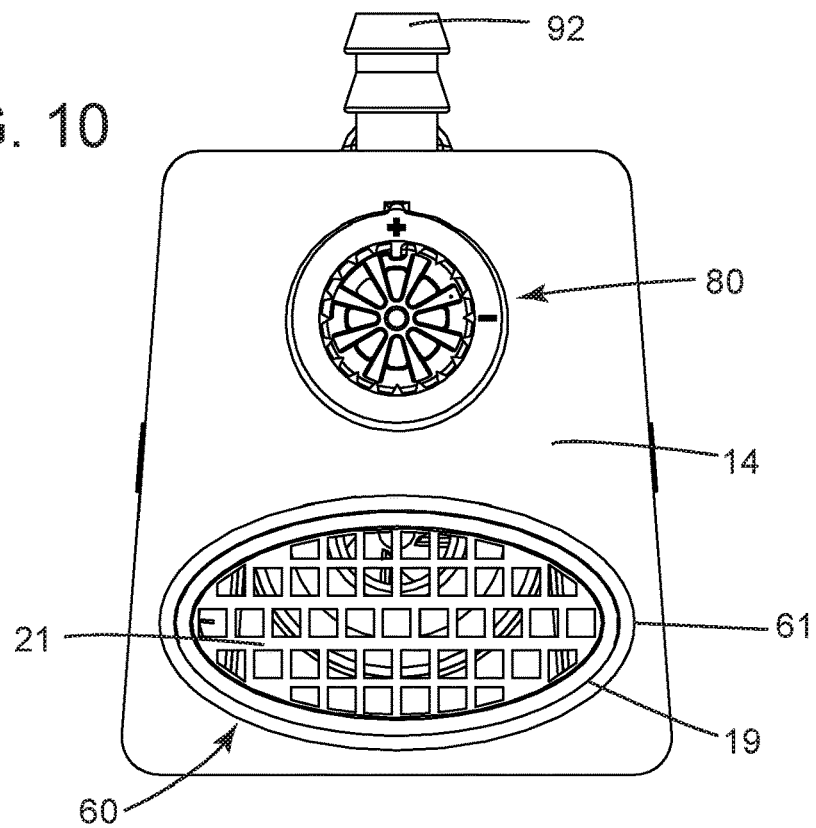
FIG. 10 depicts a front elevated view of the aquarium power cleaner of FIG. 1.
Figure 12A:
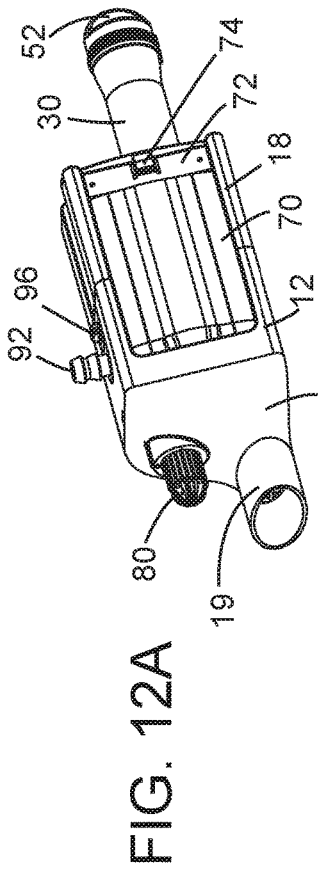
FIGS. 12A-12C depict various configurations of the extendible nozzle assembly of FIG. 11A-11C attached to the aquarium power cleaner of FIG. 1.
Figure 12B:
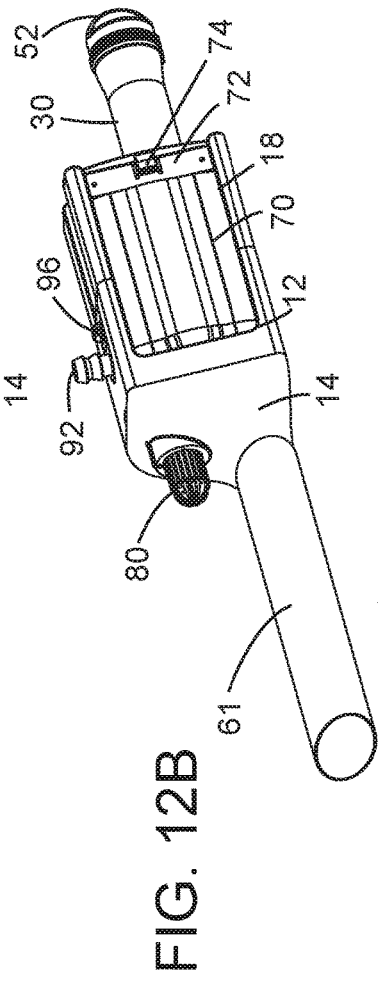
Figure 12C:
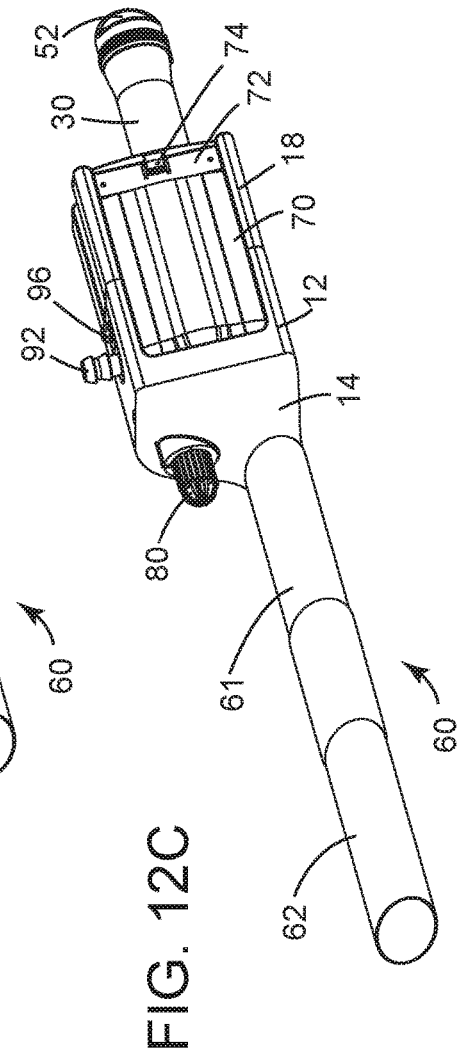

The aquarium power cleaner 10 illustratively comprises a housing 12 having a front portion 14, rear portion 16 and opposing side portions 18, which collectively form an interior chamber 24. Although the housing 12 is shown and described as being substantially rectangular, such shape is not considered limiting. The interior chamber 24 preferably includes a first intake compartment 25 and a second filtering compartment 27, which are fluidly coupled together via a conduit or channel 26 (FIGS. 15A-18) extending between the intake compartment 25 and filter compartment 27. The channel 26 is biased closed with a covering 29, such as a flap valve disposed over the end of the channel 26 within the filter compartment 27, as discussed below in further detail. A water pump assembly 30 extends through the rear portion 16 of the housing 12 as shown in FIG. 9, and a nozzle assembly 60 extends from the front portion 14 of the housing 12 as shown in FIG. 1. The pump assembly 30 includes an electric motor 32 which rotates an impeller 36 to create a low pressure area at least in the intake compartment 25 of the housing 12, and thereby draws water and debris through an inlet nozzle assembly 60 provided in the front portion 14 of the housing 12 of the cleaner 10.

The flow of water, sand/gravel/substrate and debris from the bottom of the tank can be controlled by a flow or suction control knob 80 which is illustratively provided on the front portion 14 of the housing 12. The suction control knob 80 allows an end user to selectively control the suctional forces being applied to the bottom substrate during a cleaning operation, as described below in further detail.

Figure 4:
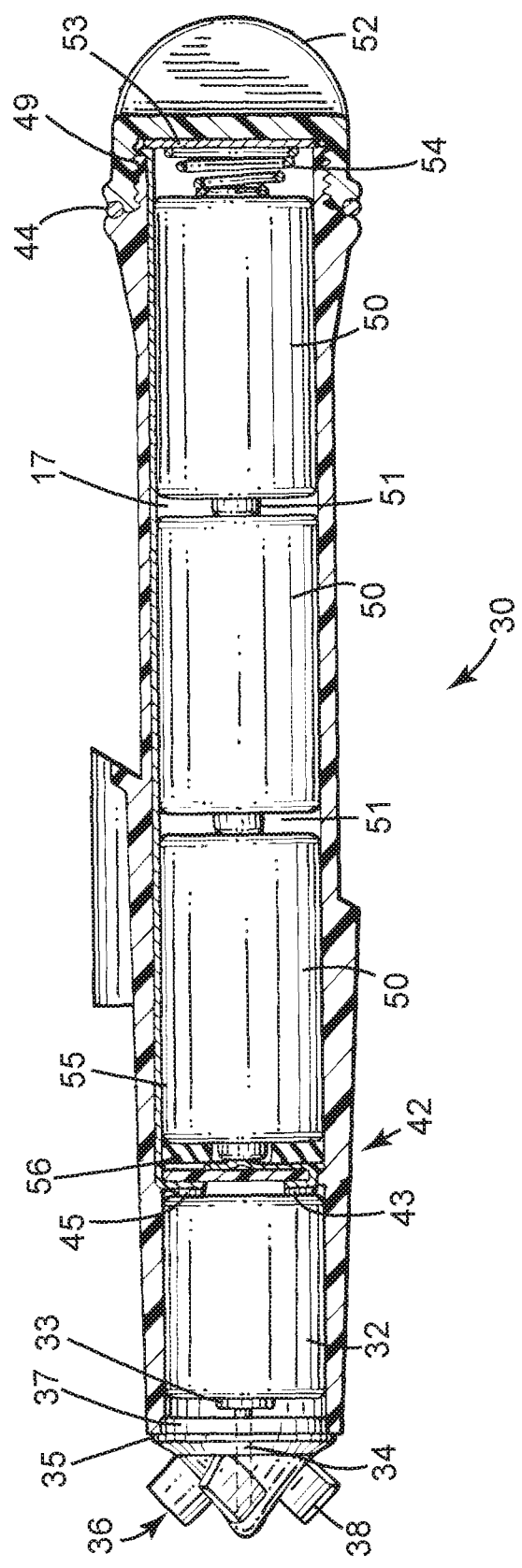
FIG. 4 is a cross-sectional view of a water pump assembly of the aquarium power cleaner of FIG. 1.

Referring now to FIGS. 3 and 4, the pump assembly 30 is preferably configured as an elongated tubular structure configured and dimensioned to receive an electric motor 32 and one or more batteries 50 in a water-tight interior compartment. The water pump assembly 30 extends outwardly from the rear portion 16 of the housing 12, for example, along its longitudinal axis so that it can conveniently serve as a handle for the end user to grasp and maneuver the aquarium power cleaner 10 during a cleaning operation. It will be understood that the tubular shape and positioning of the handle/water pump assembly 30 are not considered limiting.

Referring to FIG. 9, the handle/pump assembly 30 is removably inserted into a handle channel 13 which illustratively extends longitudinally along the rear portion 16 of the housing 12. Preferably, the forward or inserted end of the pump assembly 30 is retained in the channel 13 by opposing frictional forces as between the inner surface of the channel 13 and the outer surface of the pump assembly 30. Alternatively, the forward end of the pump assembly 30 can be inserted and retained in the handle channel 13 by a threaded connection, snap fasteners, clips, among other well-known fasteners.

Figure 4A:
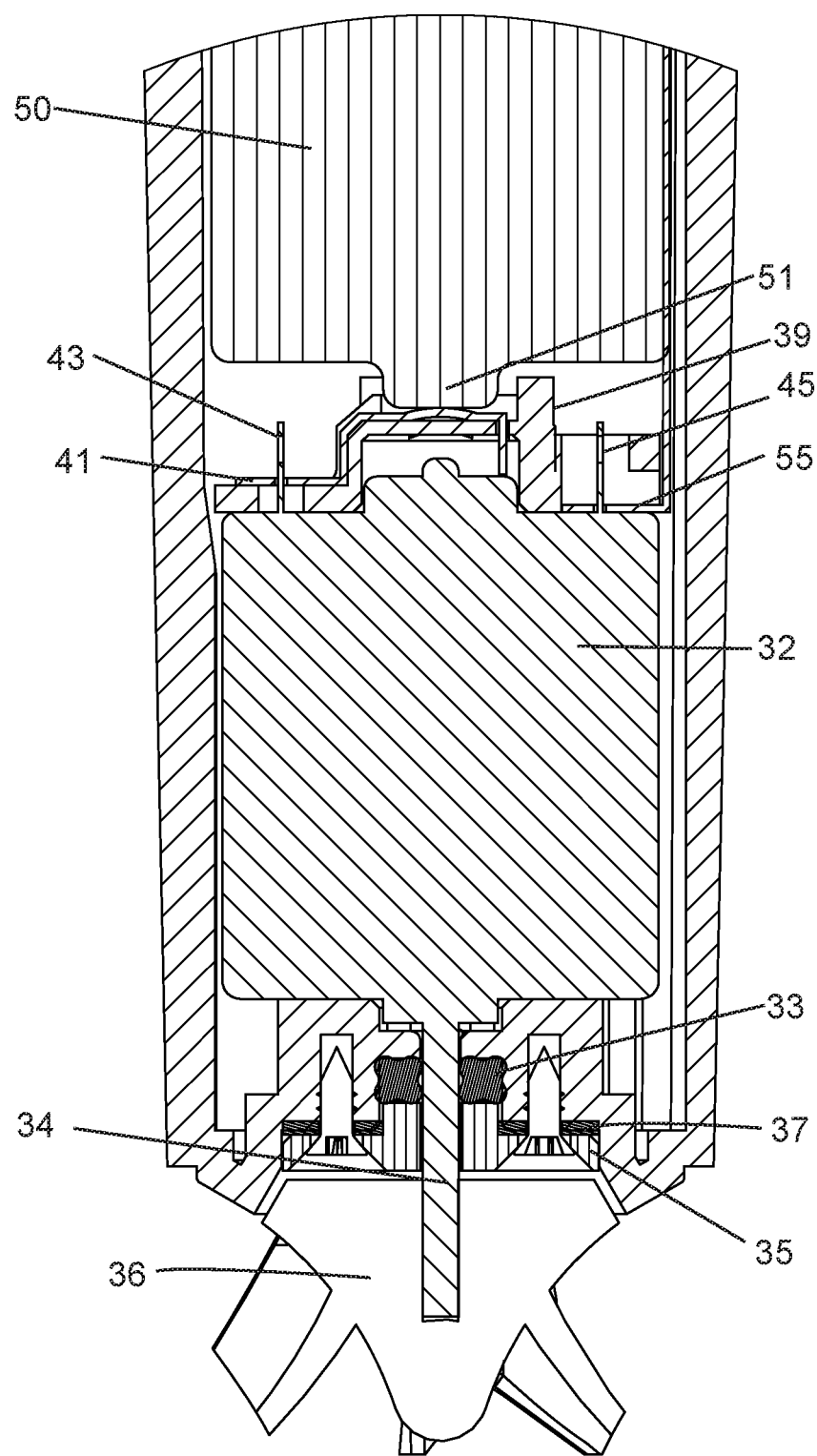
FIG. 4A is a partial, cross-sectional view of an electric motor of the pump assembly of FIG. 4.
Figure 5:
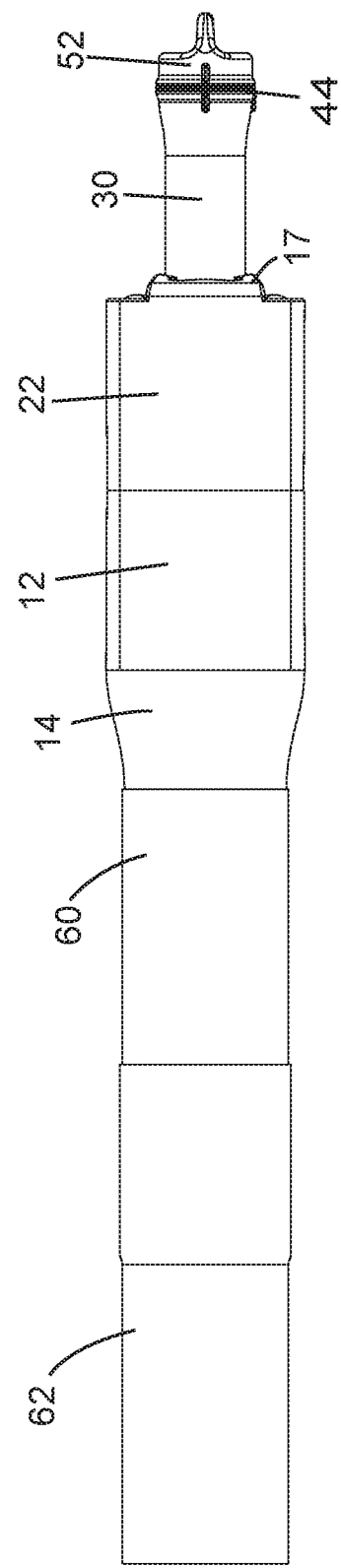
FIG. 5 is a bottom plan view of the aquarium power cleaner of FIG. 1.
Figure 6:
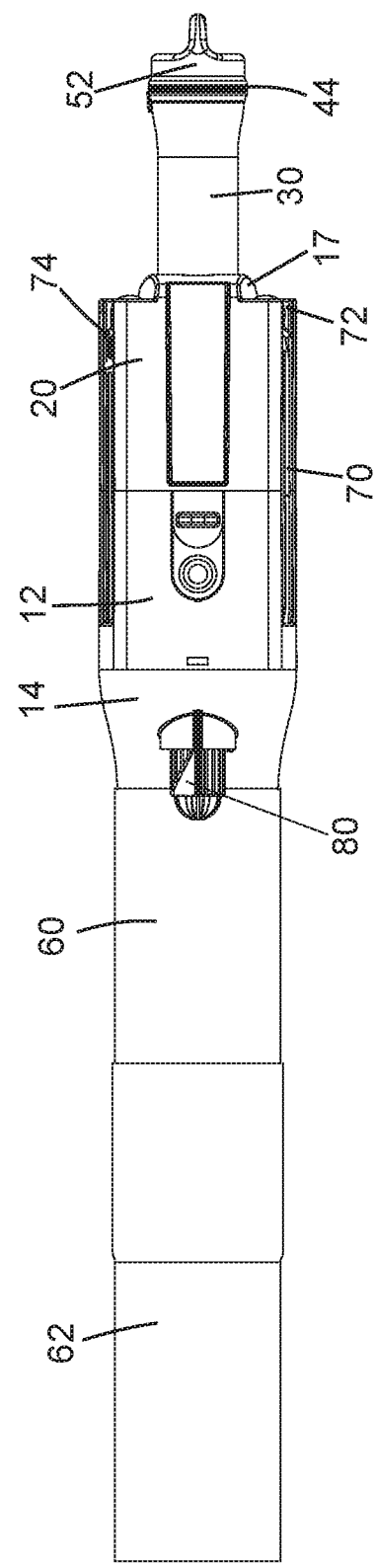
FIG. 6 is a top plan view of the aquarium power cleaner of FIG. 1.

Referring now to FIGS. 3 and 4, an impeller 36 is rotatably attached at the front end of pump assembly 30 and a power switch 52 is provided at the rear end of the pump assembly 30. More specifically, the electric motor 32 is illustratively housed in a motor chamber 42 of the pump assembly 30 and includes a rotatable impeller shaft 34 that has a distal end that extends out of the motor chamber 42, and the impeller 36 is mechanically attached to the distal end of the shaft 34 in a well-known manner. The opposing rear end of the motor 32 includes a pair of electrical contacts or terminals 43 and 45 (see FIG. 4A) that selectively receive power from the one or more serially arranged batteries 50 when the power switch 52 is activated. The electric motor 32 is preferably secured at its front end in the tubular housing by a stuffing plate 35 and gasket 37 and at its rear end by an end cover 39. Preferably, a seal 33 is provided in the housing around the rotatable impeller shaft 34. The seals and gaskets are provided to prevent water from undesirably infiltrating into the electric motor 32.

In one embodiment, the stator of the motor 32 includes a positive motor terminal 43 and a negative motor terminal 45. The batteries 50 (e.g., three C-size batteries) are serially arranged such that the positive pole 51 of a first battery contacts a first contact 41 that is serially connected to the positive terminal 43 of the motor 32. The negative pole of the illustrative serially coupled third battery contacts a coiled spring 54 which is positioned longitudinally along the internal interior surface of the switch 52. A person of ordinary skill in the art will appreciate that the number, arrangement, and type of batteries 50 (e.g., alkaline, NiCd, LiMn, Li—FeS2, and the like) that can be used to provide power to the motor 32 are not considered limiting.

An elongated conductor 55 extends from the negative terminal 45 of the motor 32 to a conductive plate 53, which is fixedly attached to the interior portion of the switch 52. The rear portion of the spring 54 is preferably affixed to the conductive plate 53 and the front portion of the spring is in resilient contact with the battery pack. The power switch 52 is rotatably attached to the rear end of the pump assembly 30 by a threaded interface 49 with a gasket 44 therebetween. Rotation of the switch 52 will cause the plate 53 to selectively come into contact with the elongated conductor 55 to complete an electrical circuit path as between the batteries 50 and the motor 32.

In one embodiment, the battery compartment 17 includes a non-conductive washer 56 to prevent the reversal of polarity to the motor 32 if the batteries 50 are mistakenly inserted into the battery compartment 17 in the wrong direction, i.e., backwards. Thus, the batteries 50 in the battery compartment 17 are arranged such that the polarity of electric power provided to the motor 32 will cause the impeller 36 to rotate in only one direction to thereby draw the water and debris into the aquarium power cleaner 10. The non-conductive washer 56 is positioned adjacently between the first positive contact 51 of the first battery 50, and the center-hole of the washer 56 is dimensioned to allow the longitudinally protruding positive terminal 51 of the first battery 50 to pass through and contact the positive motor contact 41. If the batteries 50 are improperly reversed, the washer 56 prevents the negative terminal of the battery from physically contacting motor contact 41, which is electrically coupled to the positive terminal 43 of the motor 32, and thereby precludes electrical power from being transferred to the motor 32 which would cause the motor to rotate in the wrong (i.e., reverse) direction. Rotating the motor 32 in the reverse direction is normally undesirable because the directional flow of water could also be reversed. For example, in an embodiment where the flap valve 29 is not implemented or is worn or damaged, water could flow in the opposite direction through the filter 70 and into the interior chamber 24, and then be discharged via the nozzle assembly 60.

When the switch 52 is rotated, e.g., in a counter-clockwise direction, the plate 53 disengages from the end of the elongated conductor 55, thereby forming an open circuit to deactivate the motor 32. Conversely, when the power switch 52 is rotated in the opposite, e.g., clockwise direction, the plate 53 comes into contact with the end of the conductor 55, thereby completing the circuit path and providing power from the batteries 50 to activate the electric motor 32. Markings can be provided on the outer surface of the switch 52 to identify the "on" and "off" positions.

Preferably, a seal such as an O-ring or flat gasket 44 is provided between the power switch 52 and the rear end of the pump assembly 30 to waterproof and prevent leakage of water into the interior of the pump assembly 30. Similarly, the front end of the pump assembly 30 also includes a seal 37, which is preferably held in place by the stuffing plate 35 positioned behind the impeller 36, to prevent leakage of water into the interior of the pump assembly 30 and motor/battery compartment.

The impeller 36 includes a plurality of blades 38 that produce a flow of water which is preferably angled approximately sixty degrees from the central axis along the impeller shaft 34, as opposed to being angled ninety degrees which is a common for a radial impeller. Angling the impeller 36 approximately sixty degrees increases the flow rate of the fluid through the aquarium power cleaner 10. In one embodiment, the impeller 36 can include four blades 38 having a pitch in the range of approximately 40 to 120 degrees, although the number of blades and the pitch are not considered limiting.

Referring to FIGS. 7 and 8, in one embodiment, the rotational speed of the motor 32 can also be manually controlled with a controller 58, which can include a slidable lever 59 coupled to electronic circuitry (e.g., rheostat or potentiometer, not shown) that is provided on the power switch 52. The end user can selectively move the slidable lever 59 to increase or decrease the current provided from the batteries 50 to the electric motor 32, to thereby increase or decrease the rotational speed of the impeller 36. As shown in FIG. 8, markings 48 can also be provided on the switch 52 to indicate the direction in which the lever 59 can be moved, for example, to change the resistance of the rheostat/potentiometer, and thereby increase/decrease the rotational speed of the motor 32.

Referring now to FIGS. 10-12C, the nozzle assembly 60 of the aquarium power cleaner 10 is illustratively shown. The nozzle assembly 60 is preferably configured as an elongated tubular nozzle 61 having a proximal first end configured to slide over a nozzle sleeve 19 of the front portion 14 (FIGS. 10 and 12A) and be retained thereon by frictional/adhesive forces therebetween, or by one or more fasteners or in a snap-fit arrangement. The nozzle sleeve 19 can optionally include cross-members, a grate 21 and/or screening extending across the flow path to prevent gravel and/or large particles from entering into the cleaner 10 which could cause a blockage.

The nozzle 61 is illustratively shown with an oval cross-section, although such shape is not considered limiting. The length of the nozzle 61 is sufficient to reach smaller tanks, such as five to twenty gallon sized tanks without using an extension. For larger sized tanks, a nozzle extension 62 can be fitted over the nozzle 61 to reach the bottom substrate (e.g., gravel or sand) at deeper depths, as illustratively shown in FIGS. 12A-12C. In one embodiment, the extension 62 is retained on the distal end of the nozzle 61 by frictional/adhesive forces therebetween, or by one or more fasteners or in a snap-fit arrangement. Alternatively, the extension 62 can be slidably adjusted with respect to the nozzle 61 so that the overall length of the nozzle assembly 60 can be adjusted based on the depth of the tank. Referring to FIGS. 11A-11C, the distal end of the nozzle 61 can include corrugations or ridges 64 which are sized to receive a corresponding protruding element 65 formed on a proximal end of the extension 62. Referring to the exploded view in FIG. 11C of the circled portion of FIG. 11B, the ridges 64 and protruding element(s) 65 slidably interface so that the extension 62 is retained in place along the nozzle 61, but can easily be manually adjusted by the end user. In another embodiment, the nozzle assembly 60 can include a plurality of segments that extend and retract in a telescopic arrangement.

Figure 14:
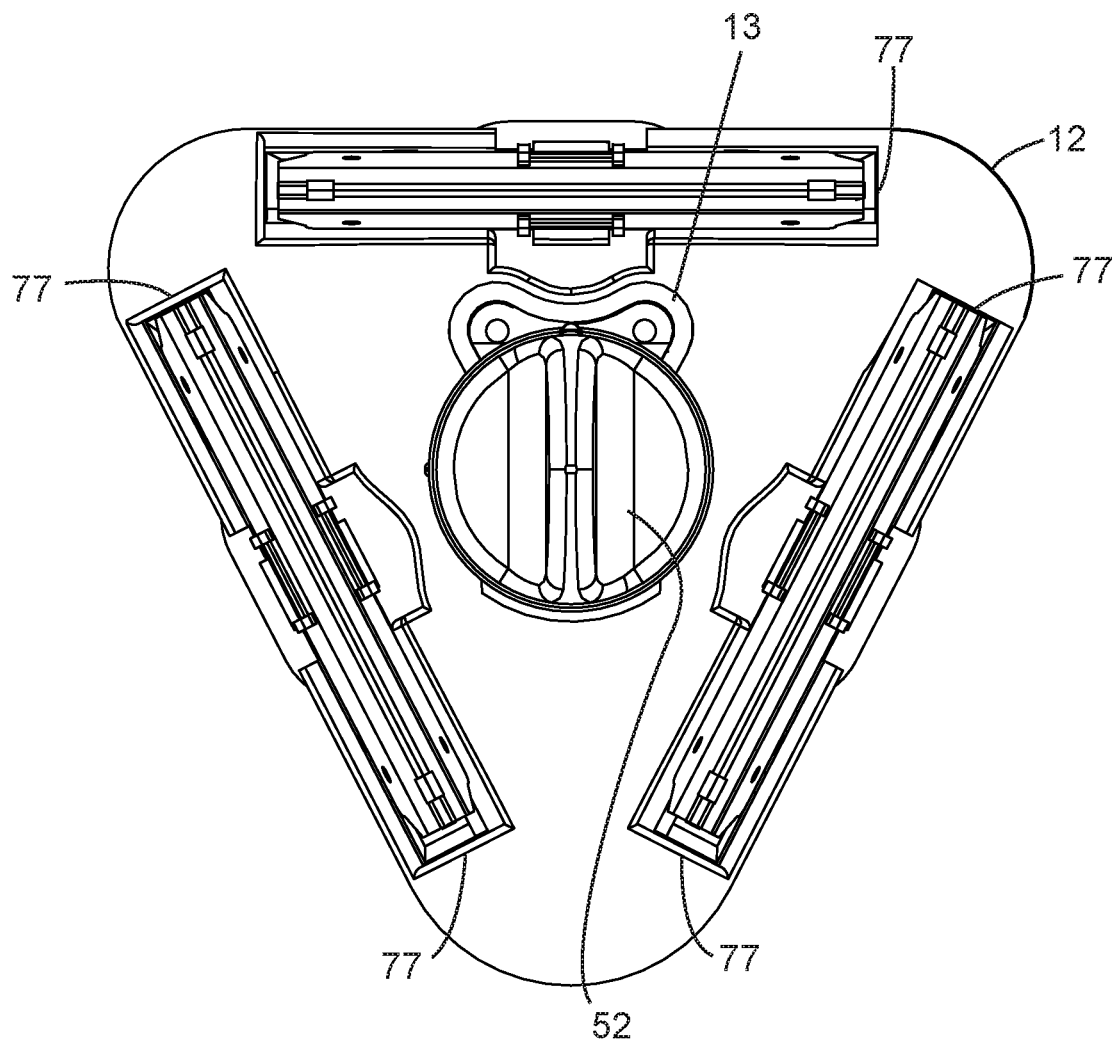
FIG. 14 is a rear elevated view of a second embodiment of the aquarium power cleaner illustrating a third filter assembly.

Referring now to FIGS. 1-13C, the aquarium cleaner housing 12 is configured with two filter assemblies 70. In an alternative embodiment, FIG. 14 illustrates a housing 12 configured with three filter assemblies 70. A person of ordinary skill in the art will appreciate that the shape of the housing 12 and the number of filter assemblies 70 are not considered limiting.

The filter assembly 70 illustratively includes a frame 72 and a filter medium or material 76 disposed over the frame 72. The filter medium 76 can be fabricated from a single layer material such as a screen mesh, a polyester-like filtering material, and or a woven or spun material and the like. Referring to FIGS. 13B and 13C, which is an exploded view of the circled portion of FIG. 13B, the filter medium 76 can alternatively be fabricated from multi-layer materials which can include the single layer materials noted above plus one or more filter additives 73, such as charcoal, ammonia absorbing crystals, and other filter mediums with varying degrees of density, coarseness and porosity. The type and contents of the filter medium 76 is not considered limiting. In the illustrative embodiment of FIGS. 13A-13C, the filter medium 76 is formed as a pouch which can be fitted over the frame 72 to provide structural integrity for the filter medium 72. The frame 72 can include a pair of flaps 75 that is attached by a living hinge and which folds over and seals the open end of the filter medium 72. A resilient clip or other fastener 74 can be provided to secure the flap 75 over the ends of the filter medium 76. The configuration of the filter assembly 70, including the types of the filter medium used herein, is provided for sake of better understanding the aquarium power cleaner 10 and is not considered limiting. In the embodiment shown in FIGS. 1-13, a pair of filter assemblies 70 can be inserted and removed along the opposing side portions 18 of the cleaner. In particular, the side portions include channels 77 which have a width configured to slidably insert and remove the filter assemblies 70 from the cleaner 10. Although two filter assemblies 70 are illustratively shown in the drawings, such quantity is not considered limiting. For example, a triangular shaped housing 12 can receive three filter assemblies 70 in corresponding channels 77, as illustratively shown in FIG. 14.

Referring now to FIGS. 15A-18, the flow and regulation of the tank water and debris into the aquarium cleaner is illustratively shown. The aquarium power cleaner 10 can be operated in a cleaning mode of operation and optionally a siphoning mode of operation.

Figure 17:
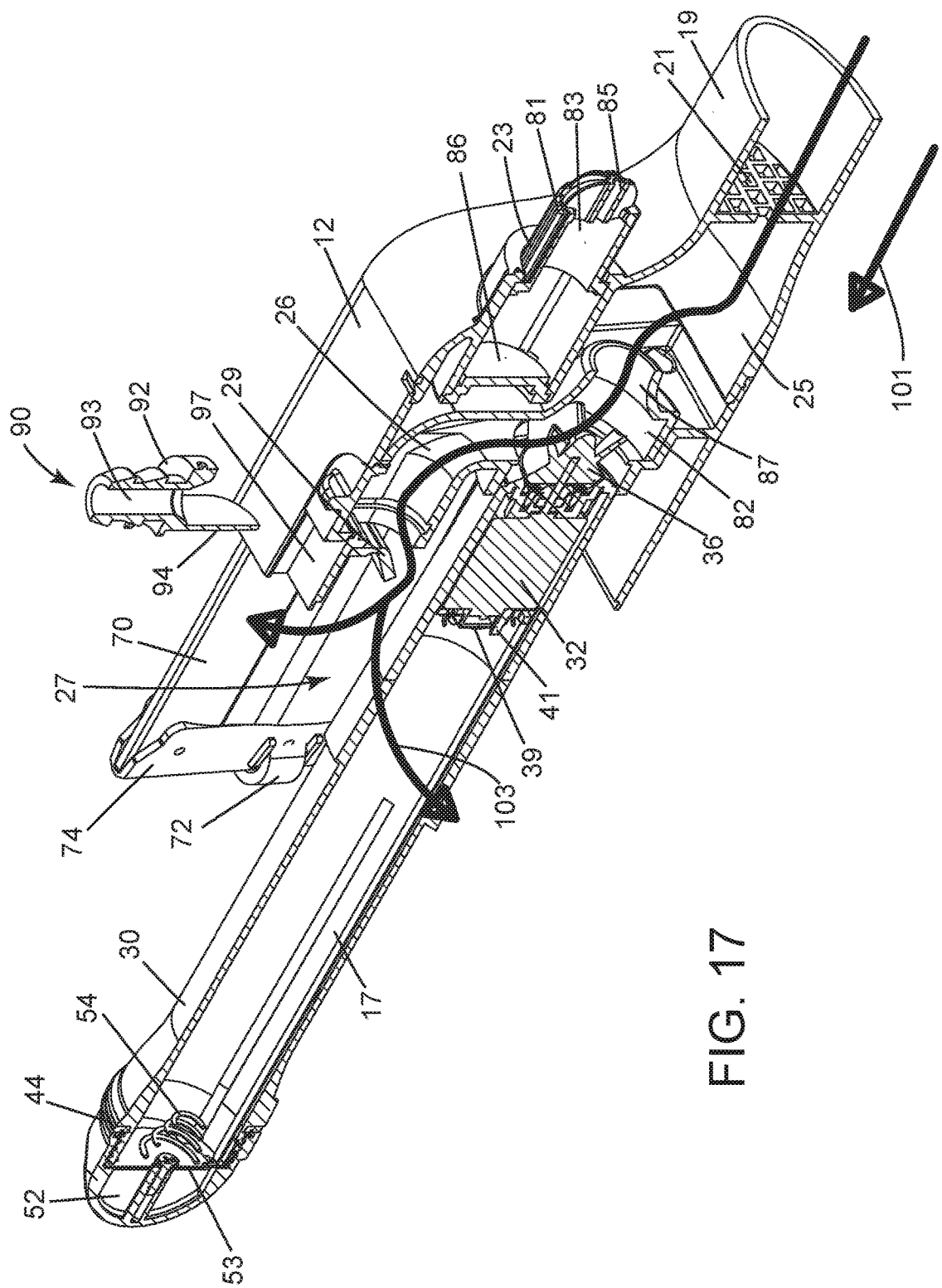
FIG. 17 is a partial left-side perspective view, taken in cross-section, illustrating the flow of water into the aquarium power cleaner of FIG. 1 during the filtering operation.

Referring to FIGS. 15A-15F, 16A and 17, the interior of the front portion 14 of the housing 12 includes the intake compartment 25, a volute portion 82, a liquid flow channel 26 and a flap valve 29. Referring to FIG. 17, when the impeller 36 is rotated by the electric motor 32, water and debris from the tank flows into the nozzle assembly 60 in a direction illustrated by arrow 101, past the grate 21 in the nozzle sleeve 19, and into the intake compartment 25. The volute 82 includes a funnel shaped opening 87 which directs and increases the speed and pressure of the water flow and debris through the channel 26 so that the flowing water forces open the flap valve 29 and enters into the filter compartment 27. The debris is captured and retained by the filter medium 76 of the filter assembly 70, and the filtered water flows from the filter medium 76 back into the tank, as illustrated by arrow 103 in FIGS. 16A and 17.

Figure 18:
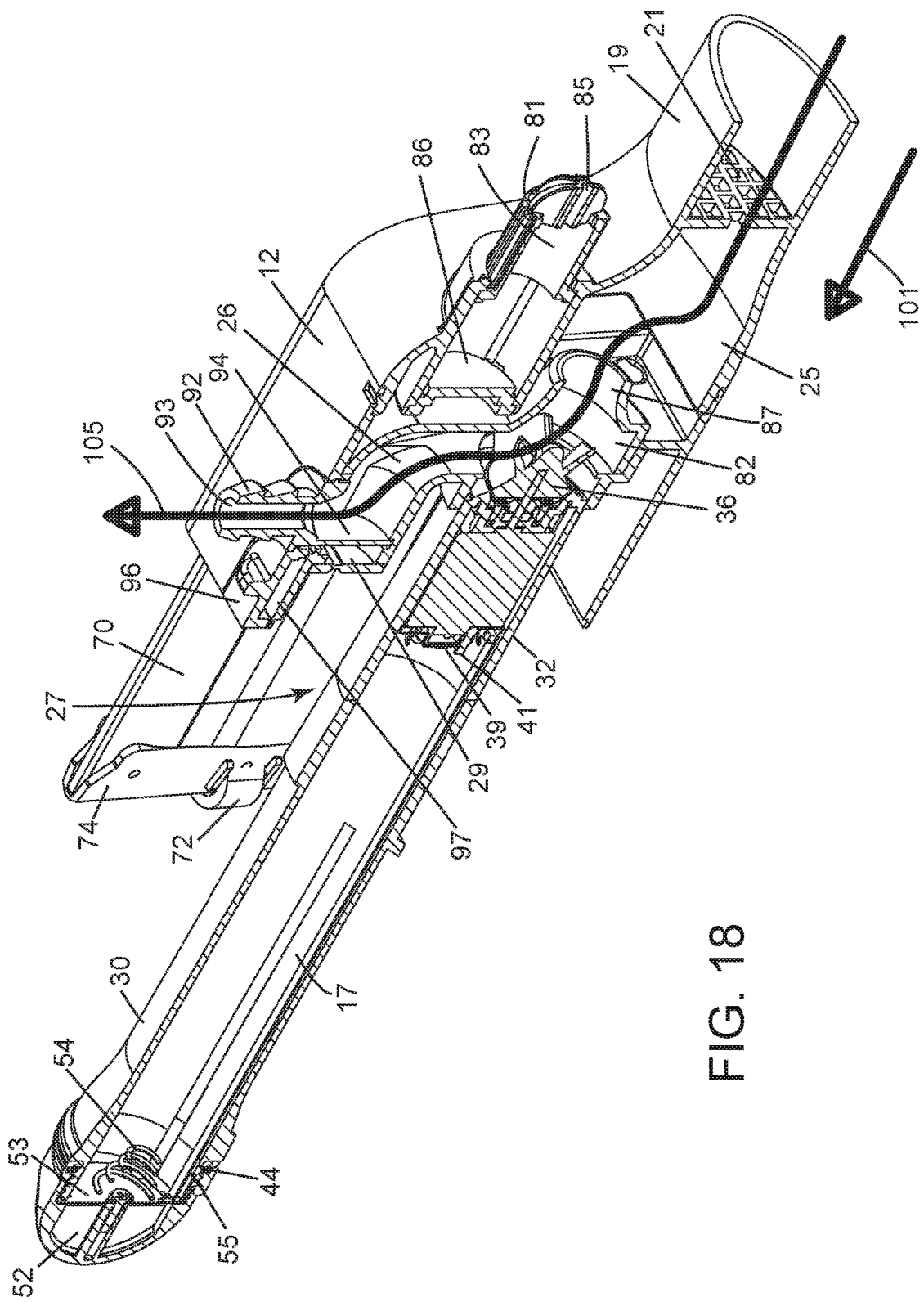
FIG. 18 is a partial left-side perspective view, taken in cross-section, illustrating the flow of water into the aquarium power cleaner of FIG. 1 during the siphoning operation.

Referring now to FIGS. 16B and 18, the embodiment shown in the drawings further includes a siphoning assembly 90 that enables a user to siphon water from the tank using the hand-held aquarium power cleaner 10. The siphoning assembly 90 includes a hose fitting adapter 92 that extends outwardly from the top portion 20 of the housing, although such housing location is not considered limiting. In one embodiment, the hose fitting adapter 92 is removably inserted into an aperture 95 (FIG. 3) formed in the top portion 20 of the housing 12. A channel 97 is formed in the top portion 20 adjacent to the adapter 92 and is dimensioned to receive a slidable cover 96.

During a bottom substrate cleaning operation, the siphon assembly 90 is preferably disabled. In an embodiment, the end user removes the hose fitting adapter 92 and slides the cover 96 over the aperture 95 to thereby seal off the aperture 95 in the channel 26 and/or intake compartment 25 of the interior chamber 24. During a siphoning operation, the actions are reversed by the end user such that the cover 96 is slidably moved in the channel 97 to expose the aperture 95 and allow the hose fitting 92 to be inserted back into the aperture 95.

Referring again to FIGS. 16B and 18, prior to a siphoning operation, the adapter 92 is installed in the housing 12 and a length of hose (not shown) is attached at one end to the adapter 92, while an opposing free end of the hose is directed to an external container, a drain or the like. The hose fitting adapter 92 includes an orifice 93 and a lower wall 94 which is dimensioned to close off the channel 26 to prevent the flow of liquid opening and flowing through the flap valve 29 and into the filter compartment 27. During the siphoning operation, the tank water flows into the nozzle assembly 60 in a direction illustrated by arrow 101, past the grate 21 in the nozzle sleeve 19, and into the intake compartment 25. The volute 82 includes the funnel shaped opening 87 which directs and increases the speed and pressure of the water and debris through the channel 26. The wall 94 of the fitting adapter 92 blocks off the flow through the flap valve 29 and directs the water flow through the fitting orifice 93 and into the attached hose, as illustrated by arrow 105 in FIGS. 16B and 18, and out of the free end of the hose at a location where the siphoned water can be temporarily stored and/or discarded.

Referring to FIGS. 15A-15F, the suctional strength of the aquarium power cleaner 10 can be controlled by the end user during either the cleaning operation or the siphoning operation via a suction control assembly 80. The suctional control assembly 80 provides an alternative route for drawing water or air into the cleaner 10, thereby reducing the strength of the suctional forces at the distal end of the nozzle assembly 60. The suction control assembly 80 is illustratively inserted through a bore formed by a cylindrical sidewall 23 provided in the front portion 14 of the housing 12. The cylindrical bore sidewall 23 includes an opening or cutout 89. The suction control assembly 80 also includes a cylindrical sidewall 88 defining an interior channel 83 with a first exterior end formed as a knob 81 having an opening or vent 85 in fluid communications with the interior channel 83. The cylindrical bore sidewall 23 is configured to receive the rotatably cylindrical sidewall 88 of the suction control assembly 80 in a watertight arrangement. The knob 81 extends outwardly from the exterior of the housing 12. The opposing end of the sidewall 88 and its channel 83 are positioned within the intake compartment 25, and the interior end of the channel is closed off by an end cap 86. The sidewall 88 further includes an opening 84 formed proximate the end cap 86 to direct the flow of water (when submerged) or air (when not submerged) into the intake compartment 25.

Referring to FIGS. 15A and 15B, the knob 81 of the suction control assembly 80 is shown rotated to a position such that the opening 84 (see FIGS. 15D and 15F) in the sidewall 88 of the suction control assembly 80 is rotated to a position adjacent to the sidewall 23 forming the cylindrical bore to thereby selectively close off the opening 84. Closing the opening 84 by rotating the knob 81 prevents water or air, as shown by arrow 107, from entering the knob opening 85 and channel 83. Accordingly, by fully closing the suctional control assembly 80 the suctional forces created by the impeller 36 are maximized at the nozzle assembly 60 end to draw water and debris into the cleaner, as illustrated by arrow 109.

Referring now to FIGS. 15C through 15F, the end-user may find it desirable to reduce the suctional forces during a cleaning or siphoning operation because gravel/sand is getting sucked into the cleaner and causing blockages. Reducing the suctional forces can help prevent the undesirable intake of the bottom substrate into the interior chamber 24 (See FIG. 2), illustratively formed by the first intake compartment 25, connecting channel 26, and second filtering compartment 27 of the cleaner 10. In FIGS. 15C and 15D, the user has rotated the control knob 81, e.g., half-way, so that the opening 84 in the sidewall 88 is positioned partially adjacent to the cutout 89 of the cylindrical bore sidewall 23. Accordingly, water or air can flow through the knob opening 85 into the channel 83 and pass directly into the intake compartment 25 via the partially aligned opening 84 and cutout 89, as illustratively shown by arrow 107 in FIG. 15C. The mixture of a second fluid (water or air) through the suction control assembly 80 reduces the suctional forces at the end of the nozzle assembly 60 of the cleaner 10. In FIGS. 15E and 15F, the user has fully rotated the control knob 81 so that the opening 84 in the sidewall 88 is positioned fully aligned with the cutout 89 of the cylindrical bore sidewall 23. Accordingly, a maximum amount of a second fluid can flow through the knob opening 85 into the channel 83 and pass directly into the intake compartment 25 via the fully aligned opening 84 and cutout 89, as illustratively shown by arrow 107 in FIG. 15E.

The present invention is a hand-held, submersible, battery-powered aquarium power cleaner 10 that draws water into an elongated nozzle with sufficient suctional force to lift and disturb the gravel inside the full tank without fully pulling the substrate out. The suctional force is adjustable by the user to account for different kinds of aquarium sands and gravel, as well as to provide different levels of cleaning. In one embodiment, the aquarium power cleaner 10 need not be fully submerged in order for the motor assembly 30 to pump water through the filter assembly 70. Alternatively, a person of ordinary skill in the art will appreciate that the pump 30 could be self-priming, and the depth at which the cleaner 10 operates is not be considered limiting. As well, a person of ordinary skill in the art will appreciate that the aquarium power cleaner 10 can be used as an auxiliary filtration device should any preexisting aquarium filtration system be present and insufficient.

The strength of the suction through the nozzle assembly 60 can be user adjusted by a rotatable knob 81, which opens and closes an internal gate or opening 84, thereby providing an alternative fluid inlet through which water or air can flow. Given that the suction control assembly 80 has a channel 83 with a smaller cross-sectional area as compared to the elongated nozzle assembly 60, not all of the suctional force at the elongated nozzle assembly 60 is lost. Rather, the suctional force at the nozzle assembly 60 is minimized when the knob 81 is set at a fully opened position. Except in those instances where the rotational speed of the impeller is manually changed by an end user, the suction created by the motor driven impeller 36 is constant. The suction control assembly 80 provides an alternative fluid path at a location away from the nozzle assembly 60 to control the suctional forces at nozzle assembly 60 during a cleaning or siphoning operation.

Preferably, the nozzle assembly 60 is fabricated from a transparent plastic material to allow the viewer to observe the movement of the gravel and sand within the nozzle and make flow adjustments accordingly. The gravel will typically rise up a few (1-4) inches inside the distal end of the nozzle assembly 60, pending the suctional forces the user has selected and the density of the gravel or sand. Should the gravel or sand prove to be exceptionally light/buoyant, the grate or screen mesh 21 is provided upstream of the impeller to block any substantially large pieces gravel (or debris/fish) from being pulled inside the cleaner and damaging the power train components (e.g., impeller, motor and the like). As the gravel and sand are suspended in the nozzle during the suction process, the agitating motion separates the excrement and other debris therefrom and without removing sand and gravel from the tank.

The debris, being much lighter in weight than the gravel and sand, continues to flow up and through the aquarium power cleaner into a filter compartment 27. From there, the water passes through preferably a multi-layer filter medium 76 (e.g., see FIG. 13C) which is configured such that porosity decreases as the water passes outwardly back into the tank. In this manner, the filter 70 does not clog as large debris is contained or trapped by the course filter material layer 78, and fine debris is collected by fine filter material layer 79. This filter configuration permits the continuous flow of water even when the filter 70 is nearing full capacity. When the aquarium power cleaner 10 is switched off, large debris will be contained within the filter compartment 27 by the closed one-way flap valve 29 and the interior walls of the filter medium 76. Accordingly, large chunks of excrement and waste will be prevented from flowing out of the cleaner 10 and can be removed from the filter compartment 27 as the cleaner 10 is subsequently rinsed out during maintenance.

In one embodiment, the filter assembly 70 is designed as a pouch that allows an end user to add additives 73 (see FIGS. 13B and 13C) such as chemical treatments and/or absorbents (e.g., carbon and the like) to further treat and clean the tank. As the water passes through the course filter medium to the fine filter medium, the additive is mixed with the outgoing water to help balance the tank pH, remove odors, and/or provide bacterial shock, among other treatment benefits. Although, current powered filter systems also provide these features, the aquarium cleaner of the present invention allows the end user to easily provide these treatments to a much wider variety of tanks, especially smaller tanks for which large filter systems are too cumbersome.

Even with consistent maintenance of an aquarium, the volume of water will eventually need to be refreshed or replaced for the overall improved health of the aquarium. To this end, the aquarium power cleaner 10 includes a bypass to allow the unit to pump water out of the tank rather than through the filter assembly. This is accomplished with the addition of a small adapter illustratively in the form of a hose fitting adapter 92 that is used to redirect water flow out of the cleaner 10 prior to entering the filtering compartment 27 and being filtered by the filters 70. The siphoning feature of the present invention helps an end user to avoid using separate siphoning tubes that may require the user to provide the initial suction by mouth or manual hand pumps to get the siphon action going.

Although an exemplary description of the invention has been set forth above to enable those of ordinary skill in the art to make and use the invention, that description should not be construed to limit the invention, and various modifications and variations can be made to the description without departing from the scope of the invention, as will be understood by those with ordinary skill in the art, and the scope thereof is determined by the claims that follow.

We claim:

1. A hand-held submersible aquarium power cleaner for cleaning debris from an aquarium, comprising:
   an elongated housing having an intake compartment and a filtering compartment therein;
   a nozzle positioned at a front end of the housing and in fluid communication with the intake compartment;
   a selectively openable channel provided between the intake compartment and the filter compartment;
   a filter disposed in fluid communication with the filter compartment;
   a water pump assembly having an impeller rotatably connected to an electric motor, the impeller being in fluid communication with the intake compartment;
   a power switch for controlling power to the electric motor, wherein rotation of the impeller draws aquarium water and debris through the nozzle and into the filtering compartment, where the debris is captured and retained by the filter and cleansed water is discharged into the aquarium; and
   a secondary inlet in fluid communication with the intake compartment for drawing air into the cleaner.

2. The aquarium power cleaner of claim 1, wherein the secondary inlet includes a control knob for controlling fluid entering the intake compartment via the secondary inlet.

3. The aquarium power cleaner of claim 1, wherein the water pump assembly comprises at least one battery for providing power to the electric motor.

4. The aquarium power cleaner of claim 3, wherein the power switch includes circuitry for selectively controlling the rotational speed of the electric motor.

5. The aquarium power cleaner of claim 1, further comprising a resilient flap disposed to cover an end of the channel provided between the intake compartment and the filter compartment.

6. The aquarium power cleaner of claim 1, wherein the filter comprises a multi-layer filter medium.

7. The aquarium power cleaner of claim 1, wherein the filter comprises a filter pouch disposed over a frame.

8. The aquarium power cleaner of claim 7, wherein the filter pouch is configured to receive one or more additives for treating the aquarium.

9. The aquarium power cleaner of claim 1, wherein the filter is removable from the housing.

10. The aquarium power cleaner of claim 1, further comprising a hose fixture in fluid communication with the intake compartment to block water flow into the filter compartment, the hose fixture configured to receive an end of a hose for siphoning water out of the aquarium.

11. The aquarium power cleaner of claim 10, wherein the hose fixture is removable from the housing during a tank cleaning operation.

12. The aquarium power cleaner of claim 10 further comprising a cover configured to close the intake compartment when the hose fixture is removed.

13. The aquarium power cleaner of claim 1, wherein the nozzle is extendible to predetermined lengths.

14. The aquarium power cleaner of claim 1 further comprising a grate in fluid communication between the nozzle and the intake compartment.

15. A method of cleaning water and a bottom substrate in an aquarium comprising:
   providing a hand-held submersible aquarium power cleaner including an elongated housing having an intake compartment and a filtering compartment therein, a nozzle positioned at a front end of the housing and in fluid communication with the intake compartment, a selectively openable channel provided between the intake compartment and the filter compartment, a filter disposed in fluid communication with the filter compartment, a water pump assembly having an impeller rotatably connected to an electric motor, the impeller being in fluid communication with the intake compartment; a power switch for controlling power to the electric motor, wherein rotation of the impeller draws aquarium water and debris through the nozzle and into the filtering compartment;
   submerging the cleaner in the water of the aquarium;
   vacuuming over one or more selected portions of the aquarium;
   adjusting suctional forces of the cleaner via an air inlet; and
   capturing and retaining, by the filter, debris entrained in the water; and discharging filtered water into the aquarium.

16. The method of claim 15, wherein the submerging step comprises submerging only a nozzle of the cleaner and a portion of the water pump assembly in the aquarium.

17. The method of claim 15, wherein said providing step comprises submerging said cleaner as an auxiliary filtration system to supplement or temporarily replace a preexisting filtration system of the aquarium.

18. The method of claim 15, wherein said adjusting step comprises adjusting an opening of the air inlet provided in said housing to change the flow of water into the cleaner.

19. The method of claim 15 further comprising the step of adding an additive to the filter.

20. The method of claim 15 further comprising the step of controlling suction of the cleaner so that the bottom substrate does not flow through the nozzle and into the filter compartment.

* * * * *